United States Patent
Liao et al.

(10) Patent No.: US 7,864,285 B2
(45) Date of Patent: Jan. 4, 2011

(54) COLOR CHOLESTERIC LIQUID CRYSTAL DISPLAY DEVICE COMPRISING A UNITARY STRUCTURES HAVING A PLURALITY OF STRIPE WALL STRUCTURES, A STRAIGHT SEAL LINE, AND A SOLID BULK REGION MADE OF A SAME MATERIAL

(75) Inventors: Yuan-Chang Liao, Yunlin County (TW); Jen-Chieh Yang, Changhua County (TW); Kuo-Lung Lo, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 121 days.

(21) Appl. No.: 11/950,270

(22) Filed: Dec. 4, 2007

(65) Prior Publication Data

US 2008/0252821 A1    Oct. 16, 2008

(30) Foreign Application Priority Data

Apr. 14, 2007    (TW) ............................... 96113193 A (51) Int. Cl.
G02F 1/1347 (2006.01)
G02F 1/1335 (2006.01)
G02F 1/1341 (2006.01)
G02F 1/1339 (2006.01)

(52) U.S. Cl. .................. 349/156; 349/79; 349/109; 349/189

(58) Field of Classification Search .................. 349/78, 349/79, 156, 109, 189, 108, 106
See application file for complete search history.

(56) References Cited

U.S. PATENT DOCUMENTS

| | | | |
|---|---|---|---|
| 5,825,451 A | 10/1998 | Ma et al. | |
| 6,285,434 B1 * | 9/2001 | Ma et al. | 349/189 |
| 6,741,321 B2 | 5/2004 | Jeong et al. | |
| 2002/0126249 A1 * | 9/2002 | Liang et al. | 349/187 |
| 2003/0133069 A1 * | 7/2003 | Jeong et al. | 349/156 |
| 2007/0002266 A1 * | 1/2007 | Seo et al. | 349/158 |

FOREIGN PATENT DOCUMENTS

WO    WO 2006/100713 A1    9/2006

* cited by examiner

*Primary Examiner*—Mark A Robinson
*Assistant Examiner*—Dennis Y Kim (57) ABSTRACT

Color cholesteric liquid crystal display devices and fabrication methods thereof are provided. The color cholesteric liquid crystal display device includes a first substrate, a second substrate and a gap interposed therebetween. A patterned enclosed structure is interposed between the first substrate and the second substrate dividing a plurality of color sub-pixel channels. A plurality of color cholesteric liquid crystals are respectively filled in each of the color sub-pixel channel, wherein an adhesion layer is tightly adhered between the second substrate and the patterned enclosed structure so as to prevent mixing of the color cholesteric liquid crystals between adjacent color sub-pixel channels.

11 Claims, 8 Drawing Sheets

COLOR CHOLESTERIC LIQUID CRYSTAL DISPLAY DEVICE COMPRISING A UNITARY STRUCTURES HAVING A PLURALITY OF STRIPE WALL STRUCTURES, A STRAIGHT SEAL LINE, AND A SOLID BULK REGION MADE OF A SAME MATERIAL

BACKGROUND OF THE INVENTION

1. Field of the Invention

The invention relates to liquid crystal display (LCD) devices, and in particular to single layer color cholesteric liquid crystal display devices and fabrication methods thereof.

2. Description of the Related Art

Liquid crystal display (LCD) devices have many advantages such as a smaller size, lighter weight and lower power consumption, and are applicable in a variety of electronic and communication devices including notebook computers, personal digital assistants (PDA), mobile phones and the like due to its lighter weight, thinner profile, and portability. Conventional reflective memorable color liquid crystal display devices are widely applicable in electronic books, electronic papers, and the likes. The structures and fabrication methods of conventional cholesteric liquid crystal display devices use a tri-layered red (R), green (G), and blue (B) pixel stacked structure corresponding to various different driving methods. However, stacking tri-layered R, G, and B pixels may result in optical aberration and misalignment during fabrication. Moreover, the tri-layered R, G, and B liquid crystal layer stacked structure are so complicated that layout of electrodes is difficult to design and an LCD panel using the stacked structure has a rigid port, resulting in an intricate fabrication processes and high fabrication costs.

Accordingly, the use of single layer color cholesteric liquid crystal display devices and fabrication methods thereof can effectively ameliorate optical aberration, simplify the fabrication process, and reduce fabrication costs. Particularly, the device is applicable to the field of color flexible LCD devices. U.S. Pat. No. 5,825,451, the entirety of which is hereby incorporated by reference, discloses a single layer color cholesteric LCD device using a combination of light decomposable/polymerizable chiral agents and single layer cholesteric LC structure. The single layer color cholesteric LCD device is illuminated by a UV light disrupting or reducing contents of chiral agent at a single region to achieve colorizing of single layer cholesteric LCD device. However, the single layer color cholesteric LCD device is easily affected by ambient light deteriorating display stability thereof.

U.S. Pat. No. 6,741,321, the entirety of which is hereby incorporated by reference, discloses an LCD device using a single LC layer and a double substrate assembly process. Different color LC materials are respectively injected into LC channels during fabrication. However, the single layer LCD assembly is not sealed enough such that overflow occurs between adjacent LC channels resulting in color mixing and reduced color saturation.

Figure 1A:
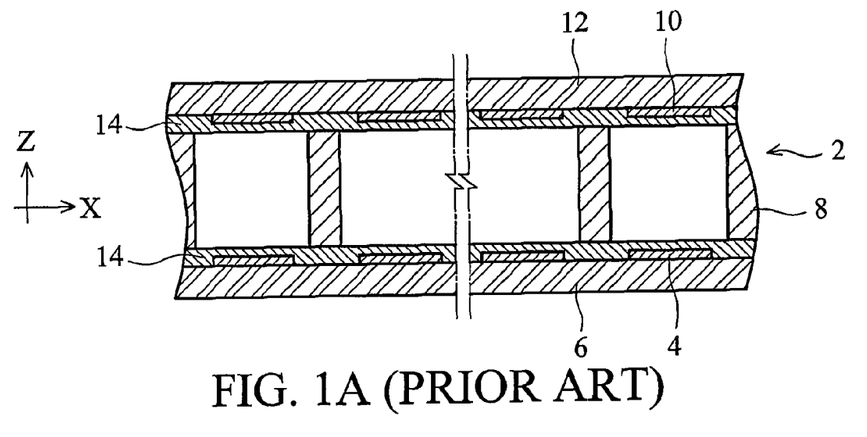
FIG. 1A is a cross section of a conventional single layer color cholesteric LCD device.

FIG. 1A is a cross section of a conventional single layer color cholesteric LCD device. Referring to FIG. 1A, a conventional single layer color cholesteric LCD panel 2 includes a lower substrate 6 and an upper substrate 12 opposed to each other and with a gap therebetween. An enclosed structure 8 is interposed between the lower substrate 6 and the upper substrate 12, dividing a plurality of stripe color sub-pixel LC channels. A first electrode 4 and an alignment layer 14 are disposed on the lower substrate 6. A second electrode 10 and an alignment layer 14 are disposed on the upper substrate 6. The first electrode 4 and the second electrode 10 are substantially perpendicular to each other.

Figure 1B:
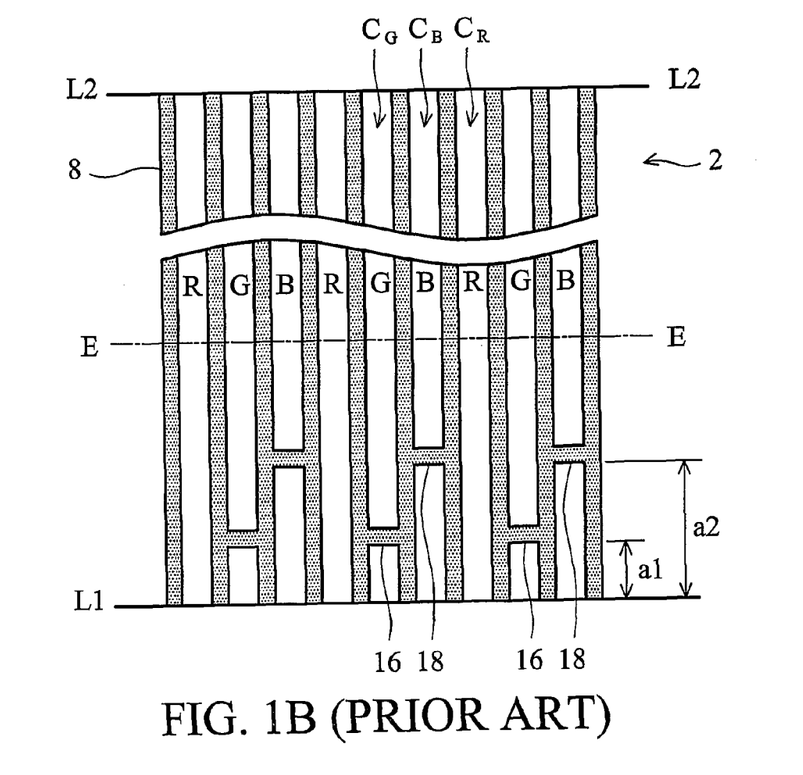
FIG. 1B is a schematic view of the lower substrate of the conventional single layer color cholesteric LCD device of FIG. 1A.

FIG. 1B is a schematic view of the lower substrate of the conventional single layer color cholesteric LCD device of FIG. 1A. In FIG. 1B, the enclosed structure 8 divides a plurality of (R, G, B) stripe color sub-pixel LC channels $C_R$, $C_G$, and $C_B$. Perpendicularly crossed segments 16 and 18 are disposed on one end of the LC channels $C_G$ and $C_B$ to seal the LC channels. After the lower substrate 6 and upper substrate 12 are assembled, the second end $L_2$ of the enclosed structure 8 are sealed by a sealant enclosing the LC channels $C_G$ and $C_B$, while the first end $L_1$ of the LC channels $C_R$ remains opened to serve as an LC injection opening. Each of the LC channels $C_R$, $C_G$, and $C_B$ is sequentially injected with respective color LC and sealed. Before filling each of the single layer color LC channels, however, conventional methods require sealing of the second end of the enclosed structure. Furthermore, when separately injection LC into the LC channels, different color LCs may overflow to adjacent LC channels and mix, thus resulting in color mixing and reduced color saturation.

BRIEF SUMMARY OF THE INVENTION

A detailed description is given in the following embodiments with reference to the accompanying drawings.

The features and aspects of the invention are related to single layer color cholesteric liquid crystal display devices and fabrication methods thereof. Different length liquid crystal (LC) channels are formed by patterning enclosed structure on a substrate, and an adhesion layer is formed on another opposing substrate. The two opposing substrate are assembled. The assembled structure is sequentially cut, injected red, green, and blue LC, and sealed to prevent color mixing and reduce color saturation.

Embodiments of the invention provide a color cholesteric liquid crystal display device, comprising: a first substrate, a second substrate opposed to each other with a gap therebetween; a patterned enclosed structure interposed between the first substrate and the second substrate dividing a plurality of color sub-pixel channels; and a plurality of color cholesteric liquid crystals respectively filled in each of the color sub-pixel channel; wherein an adhesion layer is tightly adhered between the second substrate and the patterned enclosed structure so as to prevent mixing of the color cholesteric liquid crystals between adjacent color sub-pixel channels.

Embodiments of the invention also provide a fabrication method for a color cholesteric liquid crystal display device, comprising: providing a first substrate; forming a patterned enclosed structure on the first substrate, wherein the patterned enclosed structure comprises a plurality of stripe wall structures, and one end of each stripe wall structure is connected to and perpendicular to a straight seal line, thereby dividing a first LC channel with a first opening, a second closed LC channel, and a third closed LC channel, and the length of the first LC channel exceeds that of the second LC channel, and the length of the second LC channel exceeds that of the third LC channel; providing a second substrate with an adhesion layer formed thereon; assembling the first substrate and the second substrate to tightly seal the adhesion layer and the patterned enclosed structure; injecting a first color liquid crystal in the first LC channel and sealing the first LC channel with a first seal material; cutting the assembly to expose a second opening of the second LC channel; injecting a second color liquid crystal in the second LC channel and sealing the second LC channel with a second seal material; cutting the assembly to expose a third opening of the third LC channel;

and injecting a third color liquid crystal in the third LC channel and sealing the third LC channel with a third seal material.

Embodiments of the invention further provide a fabrication method for a color cholesteric liquid crystal display device, comprising: providing a first substrate; forming a patterned enclosed structure on the first substrate, wherein the patterned enclosed structure comprises a plurality of stripe wall structures, and one end of each stripe wall structure is connected to and perpendicular to a straight seal line, thereby dividing a first LC channel with a first opening, a second closed LC channel, and a third LC channel, and the length of the first LC channel exceeds that of the second LC channel, and the length of the second LC channel exceeds that of the third LC channel; providing a second substrate with an adhesion layer formed thereon; assembling the first substrate and the second substrate to tightly seal the adhesion and the patterned enclosed structure; injecting a first color liquid crystal in the first LC channel; polymerizing the first color liquid crystal; cutting the assembly to expose a second opening of the second LC channel; injecting a second color liquid crystal in the second LC channel; polymerizing the second color liquid crystal; cutting the assembly to expose a third opening of the third LC channel; injecting a third color liquid crystal in the third closed LC channel; and polymerizing the third color liquid crystal.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
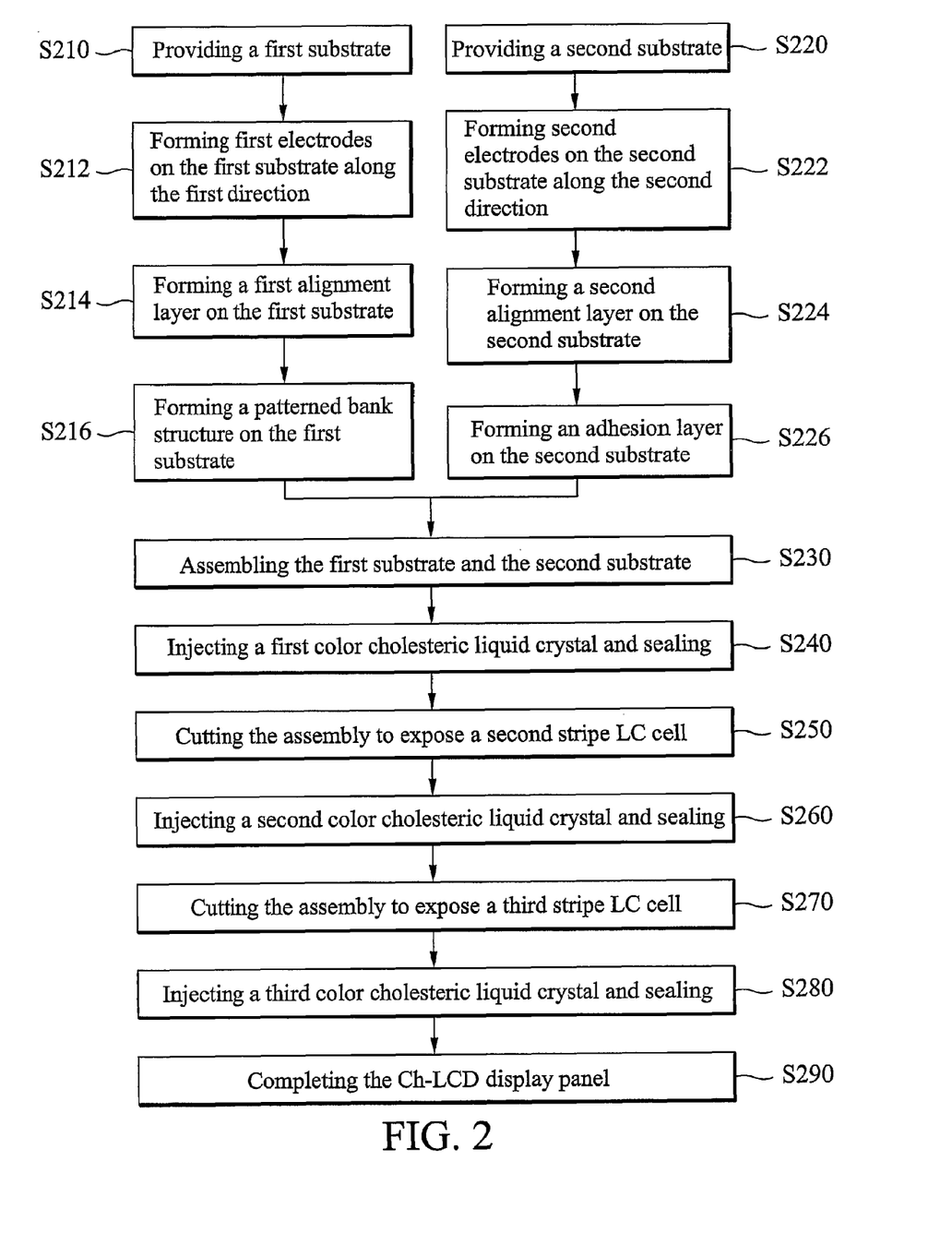
FIG. 2 is a flowchart illustrating an exemplary embodiment of a fabrication method for a single layer color cholesteric LCD device according to the invention.

FIG. 2 is a flowchart illustrating an exemplary embodiment of a fabrication method for a single layer color cholesteric LCD device according to the invention. First, preparation of a first substrate structure (such as an upper substrate structure) is proceeded including providing a first substrate (S210) and forming a patterned first electrode along the first direction on the first substrate (S212). Subsequently, a first alignment layer is formed on the first substrate covering the first electrode (S214). A patterned enclosed structure or a bank structure is then formed on the first substrate (S216). The patterned enclosed structure includes a plurality of stripe wall structures, and one end of each stripe wall structure is connected to and perpendicular to a straight seal line, thereby dividing a first LC channel with a first opening, a second closed LC channel, and a third closed LC channel.

Subsequently, preparation of a second substrate structure (such as a lower substrate structure) is proceeded including providing a first substrate (S220) and forming a patterned second electrode along the second direction on the second substrate (S222). A second alignment layer is formed on the second substrate covering the second electrode (S224), and an adhesion layer is formed overlying the second substrate (S226).

The first and second substrate structures are assembled opposed to each other with a gap interposed therebetween (S230). The patterned enclosed structure and the adhesion layer are tightly combined to prevent injection of color LCs in adjacent LC channels from overflowing. A first color cholesteric LC is filled in a first stripe LC channel and then sealed (S240). The assembly structure is cut to expose a second stripe LC channel (S250). A second color cholesteric LC is filled in the second stripe LC channel and then sealed (S260). The assembly structure is cut to expose a third stripe LC channel (S270). A third color cholesteric LC is filled in the third stripe LC channel and then sealed (S280). After all the three color cholesteric LCs are filled and sealed, fabrication of the single layer color cholesteric LCD device is completed.

Figure 3A:
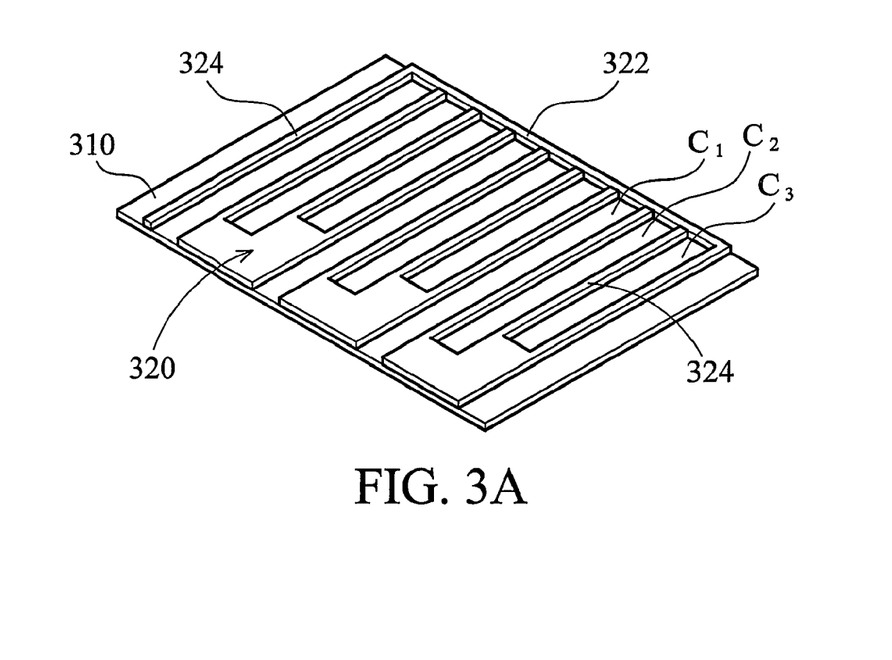
FIGS. 3A-3D are schematic views of an exemplary embodiment of each assembly step of the first and second substrate structures of the invention.

FIGS. 3A-3D are schematic views of an exemplary embodiment of each assembly step of the first and second substrate structures of the invention. Referring to FIG. 3A, a patterned enclosed structure 320 or a bank structure is formed on the first substrate. The patterned enclosed structure 320 comprises a plurality of stripe wall structures 324. One end of each stripe wall structures 324 connects to and is perpendicular to a straight end line 322 to divide a first LC channel $C_1$ with a first LC injection opening, a second closed LC channel $C_2$, and a third closed LC channel $C_3$. The length of the first LC channel $C_1$ exceeds that of the second LC channel $C_2$, and the length of the second LC channel $C_2$ exceeds that of the third LC channel $C_3$. The first substrate can be made of rigid substrates or flexible soft substrates. For example, the flexible soft substrates comprise polycarbonate (PC) substrates, polyethersulfone (PES) substrates, polyethylene terephthalate (PET) substrates, and polyimide (PI) substrates.

The first substrate may further comprise circuit elements for controlling pixel electrodes such as a thin film transistor (TFT) and a capacitor. Alternatively and optionally, the first substrate comprises pixel electrodes such as linear first electrodes along a first direction and a first alignment layer overlying the first substrate. The patterned enclosed structure can be formed by any well-known patterning processes such as lithography and screen printing, and can be made of a photoresist material.

Figure 3B:
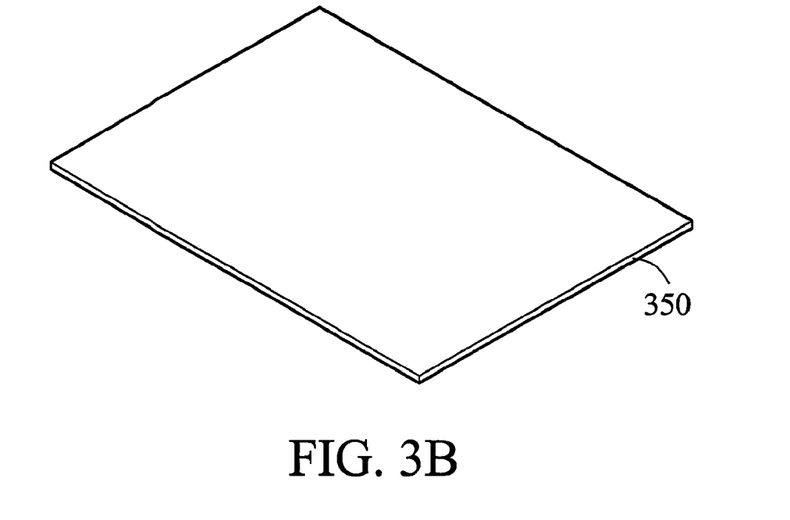
Figure 3C:
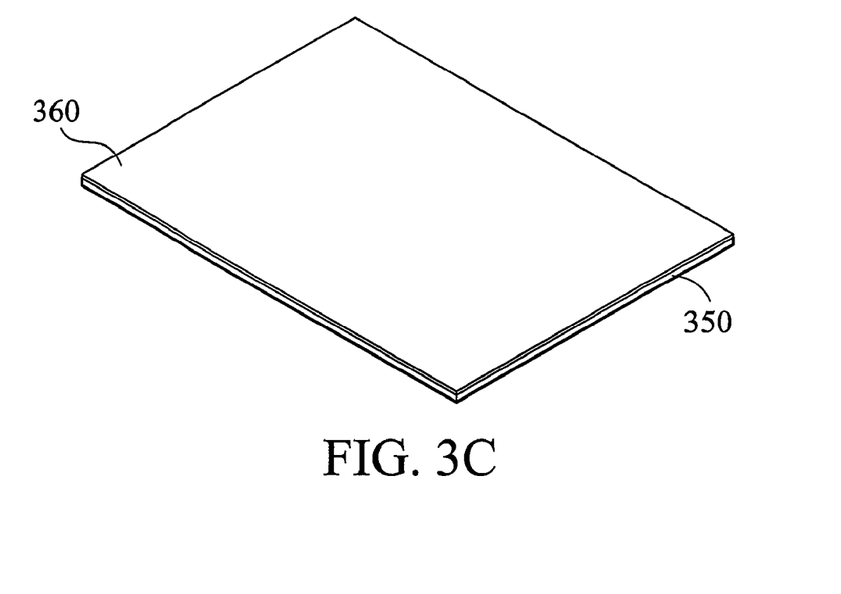

Referring to FIG. 3B, a second substrate 350 including a rigid substrate or a flexible soft substrate is provided. The second substrate 350 can comprises common electrodes, such as linear second electrodes along a second direction and a second alignment layer overlying the second substrate. The first direction and the second direction are substantially perpendicular to each other. Subsequently, an adhesion layer 360 is formed on the second substrate 350 as shown in FIG. 3C. The adhesion layer 360 is made of a glue material and a solidified material. For example, the solidified material comprises a light solidified material or a thermoset material. The thickness of the adhesion layer 350 is less than the thickness (height) of the patterned enclosed structure 320.

Figure 3D:
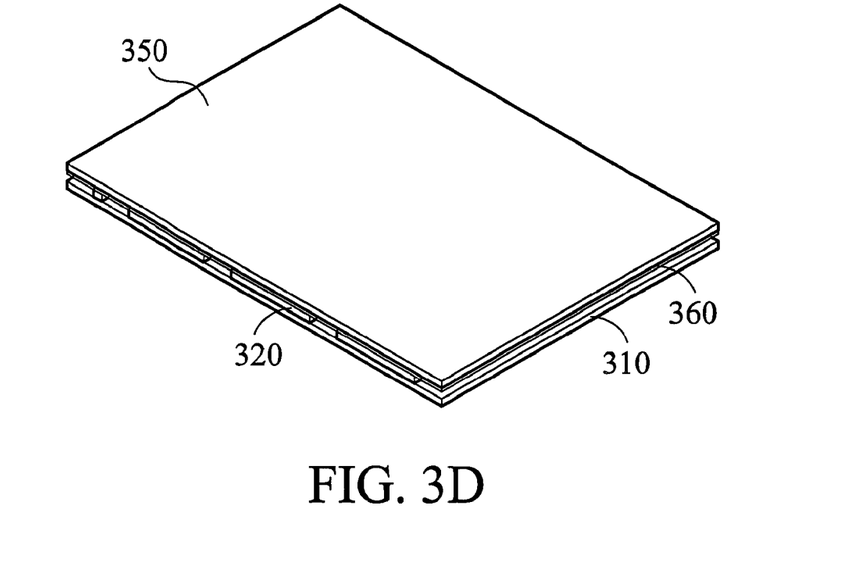

Referring to FIG. 3D, the first substrate 310 and second substrate 320 are assembled opposing each other such that the patterned enclosed structure 320 and the adhesion layer 360 are tightly combined to prevent LC overflow between adjacent LC channels during injection of color LCs.

Figure 4:
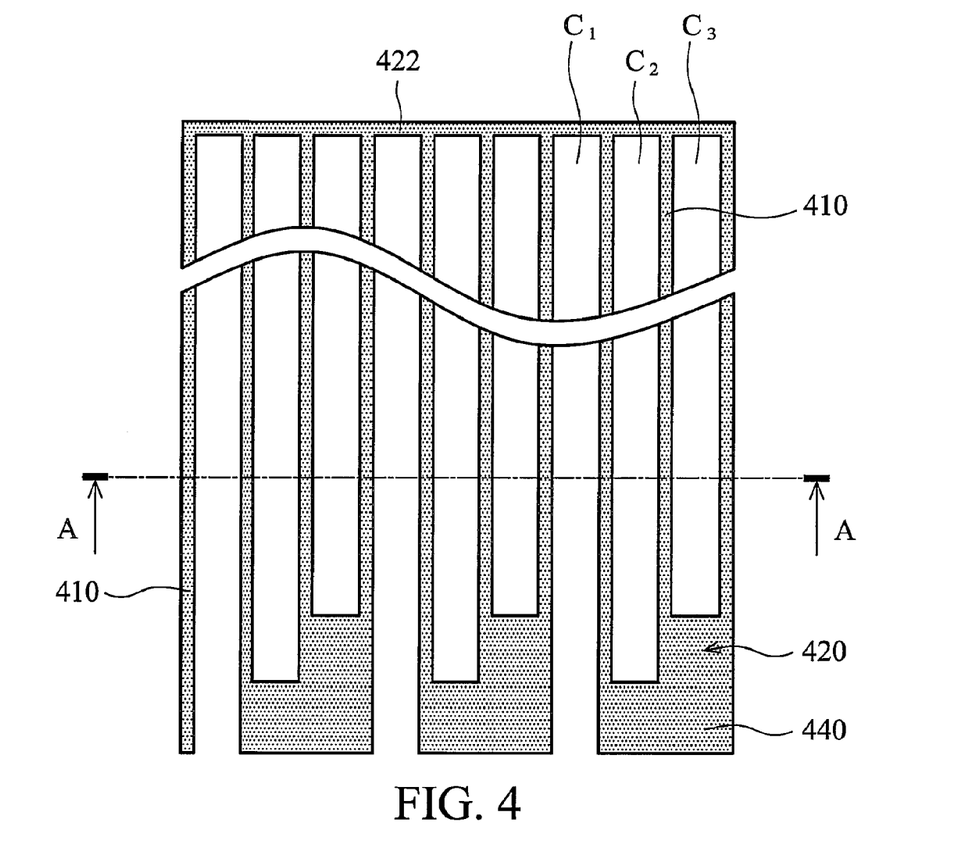
FIG. 4 is a plan view of an embodiment of the enclosed structure of the invention.

FIG. 4 is a plan view of an embodiment of the enclosed structure of the invention. In FIG. 4, a patterned enclosed structure 420 comprises a plurality of stripe wall structures 410. One end of each stripe wall structures 410 connects to and is perpendicular to a straight end line 422 and the other end of the stripe wall structures 410 connects to a bulk region 440, thereby dividing a first LC channel $C_1$ with a first LC injection opening, a second closed LC channel $C_2$, and a third closed LC channel $C_3$. The length of the first LC channel $C_1$ exceeds that of the second LC channel $C_2$, and the length of the second LC channel $C_2$ exceeds that of the third LC channel $C_3$. The bulk region 440 can enhance adhesion between the patterned enclosed structure and the adhesive layer, thereby preventing LC overflow between adjacent LC channels during injection of color LCs.

Figure 5:
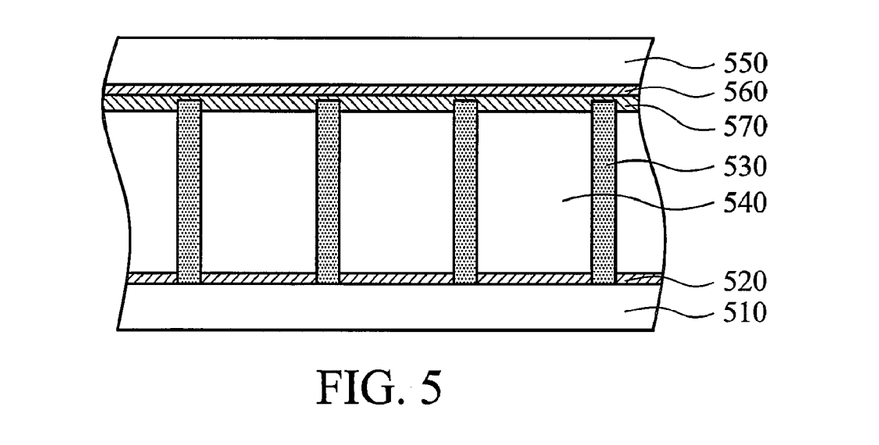
FIG. 5 is a cross section of an embodiment of the substrate structure assembly taken along A-A line of FIG. 4.

FIG. 5 is a cross section of an embodiment of the substrate structure assembly taken along A-A line of FIG. 4. Referring to FIG. 5, the combination of the first and second substrate structure includes the first substrate 510 and second substrate 550 opposed to each other with a plurality of parallel LC channel 540 for containing respective color LCs interposed therebetween. A linear electrode 520 such as a pixel electrode along the first direction is disposed on the first substrate 510. A linear electrode 560 such as a common electrode along the second direction is disposed on the second substrate 550. The patterned enclosed structure 530 and the adhesion layer 570 between the first substrate 510 and second substrate 550 are tightly combined to prevent LC overflow between adjacent LC channels during injection of color LCs.

Figure 6A:
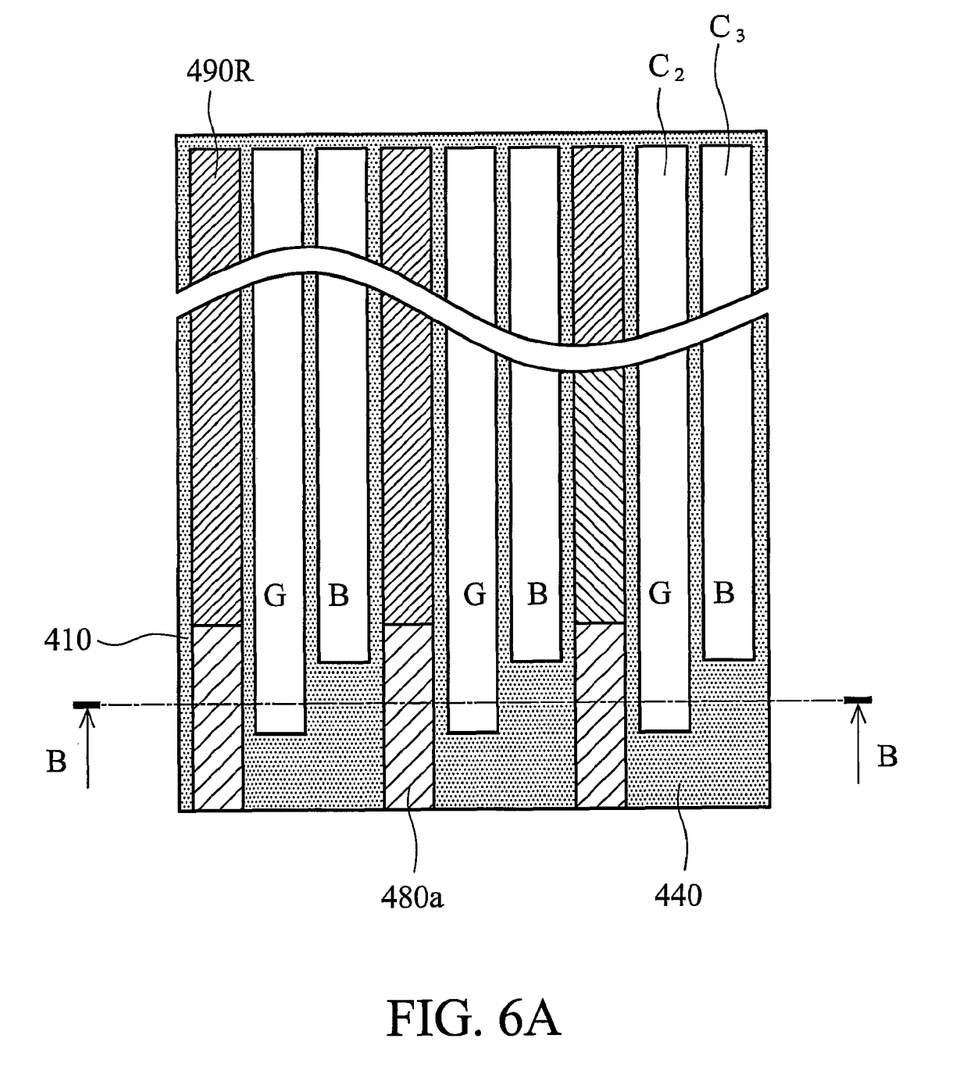
FIGS. 6A-6C are schematic views of an embodiment of each step of injecting each color LC into respective LC channels of the invention.
Figure 6B:
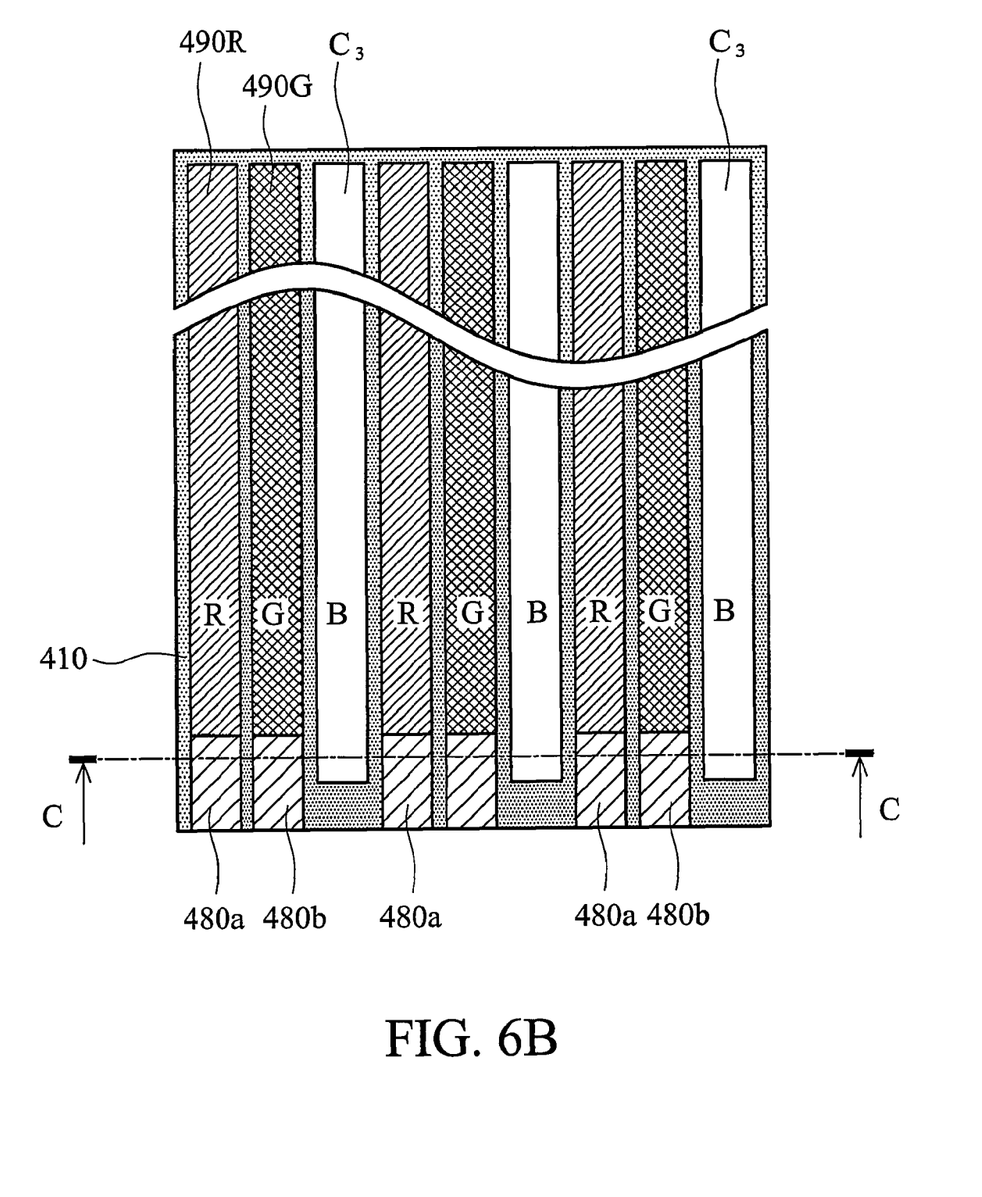
Figure 6C:
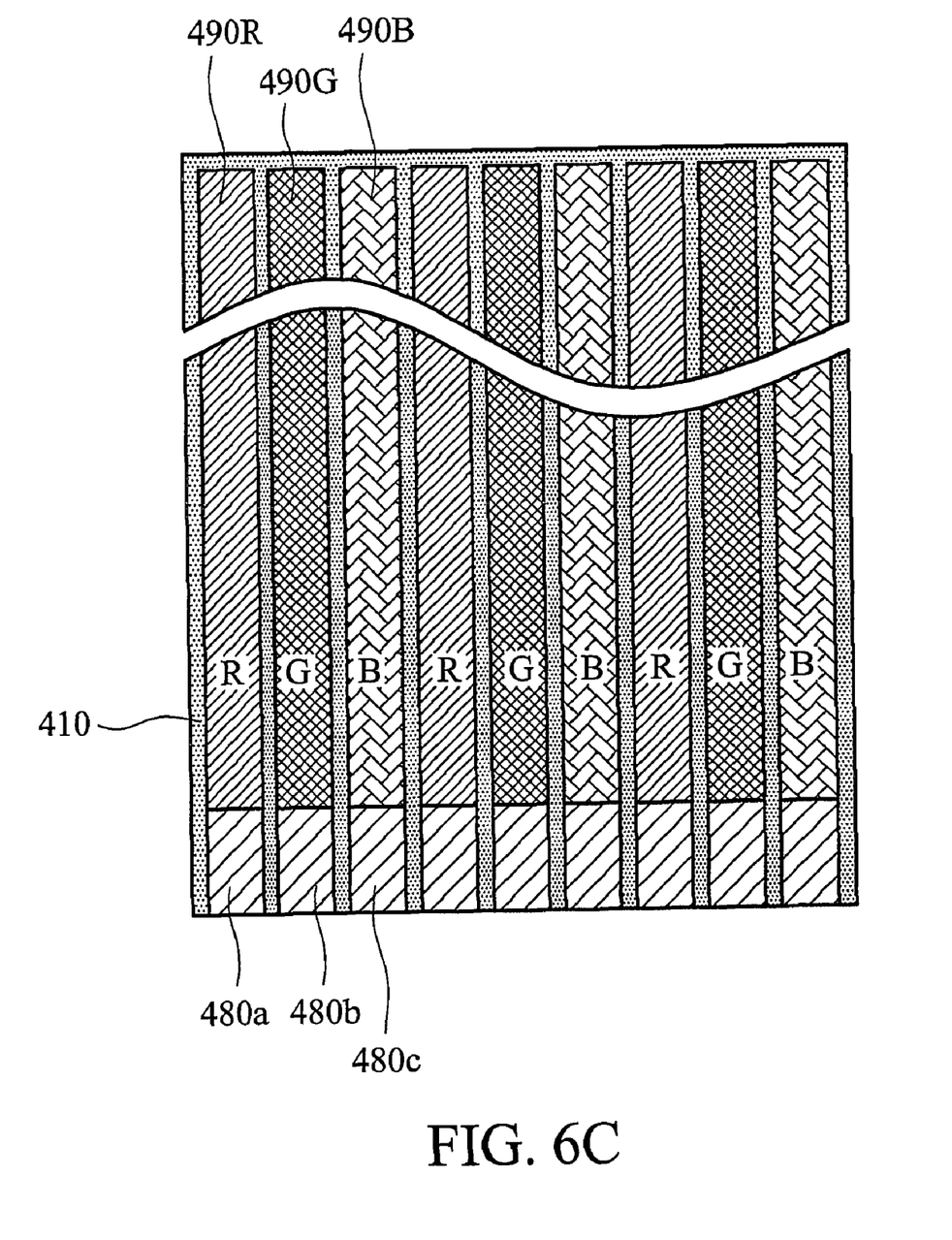

FIGS. 6A-6C are schematic views of an embodiment of each step of injecting each color LC into respective LC channels of the invention. Referring to FIG. 6A, a first color (e.g., red) cholestic LC 490R is ejected into a first LC channel, and the first LC channel is then sealed by a first sealant 480a. For example, a red cholesteric CL material comprises mixture of red dye and twisted nematic liquid crystal layer doped with chiral agent. The first sealant 480a can comprise a light solidified material or a thermoset material. Next, a first cutting procedure is performed such as along cutting line B-B to uncover the second stripe LC channel $C_2$. The first cutting procedure can be performed by dice-cutting and laser-cutting.

Referring to FIG. 6B, a second color (e.g., green) cholestic LC 490G is ejected into a second LC channel, and the second LC channel is then sealed by a second sealant 480b. For example, a green cholesteric CL material comprises mixture of green dye and twisted nematic liquid crystal layer doped with chiral agent. The second sealant 480b can comprise a light solidified material or a thermoset material. Next, a second cutting procedure is performed such as along cutting line C-C to uncover the third stripe LC channel $C_3$. The second cutting procedure can be performed by dice-cutting and laser-cutting.

Referring to FIG. 6C, a third color (e.g., blue) cholestic LC 490B is ejected into a third LC channel, and the third LC channel is then sealed by a third sealant 480c. For example, a blue cholesteric CL material comprises mixture of blue dye and twisted nematic liquid crystal layer doped with chiral agent. The third sealant 480c can comprise a light solidified material or a thermoset material. After all the three color cholesteric LCs are filled and sealed, fabrication of the single layer color cholesteric LCD device is completed.

Note that in the abovementioned description in some embodiments, each color cholesteric LC layer of the invention can further comprise polymer dispersed liquid crystal (PDLC) material. An LC fluid containing monomer or oligomer units would be injected into stripe LC channels. After illuminated by UV light, the LC fluid containing monomer or oligomer units is polymerized into polymer dispersed liquid crystal (PDLC). Using PDLC can omit sealing procedures of each stripe LC channel. For example, after the first and second substrate structures are assembled, a first color liquid crystal is injected into the first LC channel. After the first color liquid crystal is polymerized, the assembly is cut to uncover a second opening of the second LC channel. Next, a second color liquid crystal is injected into the second LC channel. After the second color liquid crystal is polymerized, the assembly is cut to uncover a third opening of the third LC channel. A third color liquid crystal is injected into the third closed LC channel. The third color liquid crystal is then polymerized. After all the three color cholesteric LC are filled and sealed, fabrication of the single layer color cholesteric LCD device is completed.

Note that there are additional steps not mentioned here, which are required to complete the single layer color cholesteric LCD device, but which are not essential to an understanding of the invention and are well-known to those with ordinary skill in the art.

Embodiments of the invention are advantageous in that an enclosed structure dividing different length of LC injection channels is formed on one substrate, and an adhesion layer is applied on the other substrate. After the two opposing substrate are assembled, the enclosed structure and the adhesion layer are tightly combined to prevent LC overflow between adjacent LC channels during injection of color LCs. The assembled structure is sequentially cut, injected red, green, and blue LC, and sealed to prevent color mixing and reduce color saturation. Thus, simplifying fabrication processes and reducing production costs.

While the invention has been described by way of example and in terms of the several embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A color cholesteric liquid crystal display device, comprising:
   a first substrate, a second substrate opposed to each other with a gap therebetween;
   a patterned enclosed structure interposed between the first substrate and the second substrate dividing a plurality of color sub-pixel channels; and
   a plurality of color cholesteric liquid crystals respectively filled in each of the color sub-pixel channels;
   wherein an adhesion layer is tightly adhered between the second substrate and the patterned enclosed structure so as to prevent mixing of the color cholesteric liquid crystals between adjacent color sub-pixel channels, and
   wherein the patterned enclosed structure comprises a unitary structure having a plurality of stripe wall structures, a straight seal line connected to and perpendicular to the same end of each stripe wall structure, and a solid bulk region with a relative larger width than the stripe wall structures connected to the other end of each stripe wall structure, wherein the unitary structure defines three different length liquid crystal channels, and wherein the unitary structure of the plurality of stripe wall structures, the straight seal line, and the solid bulk region are made of a same material.

2. The color cholesteric liquid crystal display device as claimed in claim 1, wherein a first electrode along a first direction is disposed on the first substrate, and a second electrode along a second direction is disposed on the second substrate, and the first direction and the second direction are substantially perpendicular to each other.

3. The color cholesteric liquid crystal display device as claimed in claim 2, further comprising a first alignment layer disposed on the first substrate, and a second alignment layer disposed on the second substrate.

4. The color cholesteric liquid crystal display device as claimed in claim 1, wherein the plurality of color cholesteric liquid crystals comprises a red sub-pixel, a green sub-pixel, and a blue sub-pixel.

5. The color cholesteric liquid crystal display device as claimed in claim 1, wherein each color cholesteric liquid crystal layer comprises a respective color dye and a twisted nematic liquid crystal layer doped with chiral agent.

6. The color cholesteric liquid crystal display device as claimed in claim 1, wherein each color cholesteric liquid crystal layer comprises a polymer dispersed liquid crystal (PDLC).

7. The color cholesteric liquid crystal display device as claimed in claim 1, wherein the first substrate and the second substrate are made of rigid substrates or flexible substrates.

8. The color cholesteric liquid crystal display device as claimed in claim 1, wherein both the first substrate and the second substrate comprise a polycarbonate (PC) substrate, a polyethersulfone (PES) substrate, a polyethylene terephthalate (PET) substrate, or a polyimide (PI) substrate.

9. The color cholesteric liquid crystal display device as claimed in claim 1, wherein the adhesion layer is made of a glue material and a solidified material.

10. The color cholesteric liquid crystal display device as claimed in claim 9, wherein the solidified material comprises a light solidified material or a thermoset material.

11. The color cholesteric liquid crystal display device as claimed in claim 1, wherein the patterned enclosed structure comprises photoresist materials.

* * * * *